US009142064B2

(12) United States Patent
Muetzel et al.

(10) Patent No.: US 9,142,064 B2
(45) Date of Patent: Sep. 22, 2015

(54) SYSTEM FOR DETECTING VEHICLE DRIVING MODE AND METHOD OF CONDUCTING THE SAME

(71) Applicant: ZF Friedrichshafen AG, Friedrichshafen (DE)

(72) Inventors: Ronald Muetzel, Hawthorn Woods, IL (US); Sabine Ibele, Ravensburg (DE); Thomas Roesch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 64 days.

(21) Appl. No.: 13/961,330

(22) Filed: Aug. 7, 2013

(65) Prior Publication Data
US 2015/0046046 A1 Feb. 12, 2015

(51) Int. Cl.
*F16H 61/12* (2010.01)
*G07C 5/00* (2006.01)
(52) U.S. Cl.
CPC ...................................... *G07C 5/008* (2013.01)
(58) Field of Classification Search
USPC ................... 701/51, 53, 62, 29.2, 31.4, 31.5
See application file for complete search history.

(56) References Cited

U.S. PATENT DOCUMENTS

| 6,573,839 | B2 * | 6/2003 | Kimmet | 340/945 |
| 6,799,110 | B2 * | 9/2004 | Hashimoto et al. | 701/62 |
| 2010/0063673 | A1 * | 3/2010 | Anderson | 701/34 |
| 2010/0256882 | A1 * | 10/2010 | Dreier et al. | 701/62 |
| 2012/0221216 | A1 * | 8/2012 | Chauncey et al. | 701/51 |
| 2014/0277916 | A1 * | 9/2014 | Mullen et al. | 701/31.4 |

* cited by examiner

Primary Examiner — Edwin A Young
(74) Attorney, Agent, or Firm — Brinks Gilson & Lione

(57) ABSTRACT

The present application is related to an vehicle driving mode detection system. The system may comprise a sensor interface and a processor. The sensor interface may be configured to receive measurement data associated with a plurality of operating parameters of a vehicle; and send the measurement data to a processor. The processor may be configured to execute a set of instructions stored in a computer-readable storage medium to receive the measurement data from the sensor interface; determine a driving mode of the vehicle based on the measurement data; compare the driving mode of the vehicle with a first reference driving mode of the vehicle; produce an alert signal when the driving mode is substantially different from a first reference driving mode; and send the alert signal to an information center remote to the sensor unit when a predetermined condition occurs.

16 Claims, 3 Drawing Sheets

SYSTEM FOR DETECTING VEHICLE DRIVING MODE AND METHOD OF CONDUCTING THE SAME

BACKGROUND

Driving is inherently dangerous. A vehicle driver and passengers run the risk of an accident. When an accident occurs, witnesses, the driver, or the passengers may alert rescue personnel such as police officers, firefighters, and paramedics. The rescue personnel may arrive a few minutes after the accident upon receiving a 911 phone call from a witness, the driver, or passengers. However, the timely arrival of rescue personnel is limited if no one is available to alert rescue personnel. If the accident occurs within an area where, or at a time when, no witness is available, and the accident is so severe that the driver and passengers are incapable of alerting rescue personnel, a timely rescue response is unlikely. Further, if a person steals a vehicle and kidnaps the passengers inside, passengers in the vehicle may not be able to alert rescue personnel despite their physical condition. Thus, an alert system for auto-detecting accidents and other occurrences related to vehicles is needed.

SUMMARY OF THE INVENTION

In one aspect, a vehicle driving mode detection system may comprise a sensor interface and a processor. The sensor interface may be configured to receive measurement data associated with a plurality of operating parameters of a vehicle and send the measurement data to the processor. The processor may be configured to execute a set of instructions stored in a computer-readable storage medium to receive the measurement data from the sensor interface; determine a driving mode of the vehicle based on the measurement data; compare the driving mode of the vehicle with a first reference driving mode of the vehicle; produce an alert signal when the driving mode is substantially different from a first reference driving mode; and send the alert signal to an information center remote to the sensor unit when a predetermined condition occurs.

In another aspect, a computer-implemented method for detecting abnormal driving behavior of an automobile may comprises receiving measurement data associated with a plurality of operating parameters of a vehicle; determining a driving mode of the vehicle based on the measurement data; producing an alert signal when the driving mode is substantially different from a first reference driving mode; and sending the alert signal to an information center remote to the sensor interface when a predetermined condition occurs.

In another aspect, a non-transitory computer-readable storage medium may comprise a set of instructions for detecting driving mode of a vehicle. The set of instructions may direct a processor to perform acts of receiving, from a sensor interface, measurement data associated with a plurality of operating parameters of a vehicle; determining a driving mode of the vehicle based on the measurement data; producing an alert signal when the driving mode is substantially different from a first reference driving mode; and sending the alert signal to an information center remote to the sensor interface when a predetermined condition occurs.

BRIEF DESCRIPTION OF THE DRAWINGS

The exemplary systems and methods described below may be more fully understood by reading the following description in conjunction with the drawings, in which.

The exemplary systems and methods as described herein may take a number of different forms. Not all of the depicted components may be required and some implementations may include additional, different, or fewer components from those expressly described in this disclosure. Variations in the arrangement and type of the components may be made without departing from the spirit or scope of the claims as set forth herein.

DETAILED DESCRIPTION OF EXAMPLE EMBODIMENTS

Figure 1:
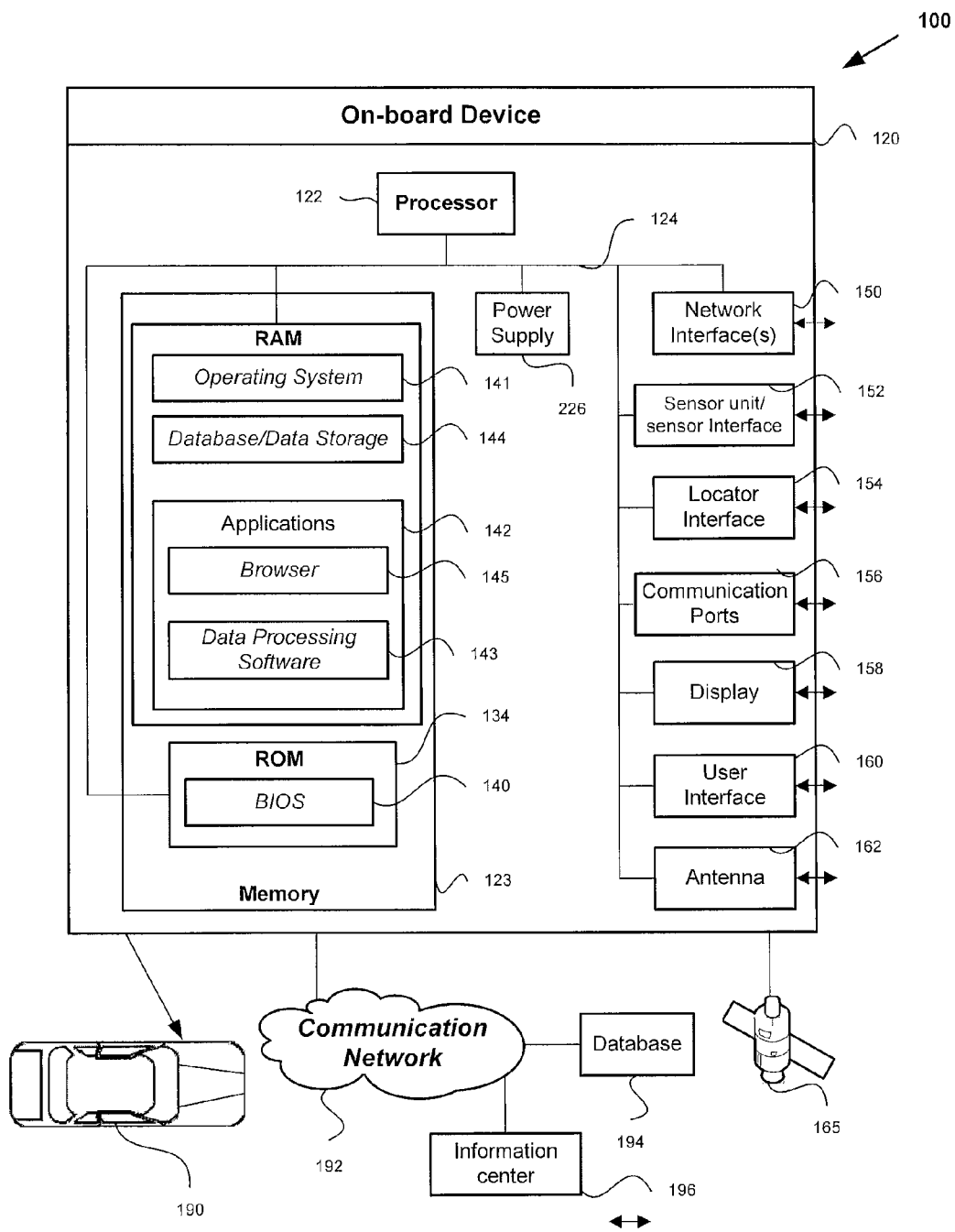
FIG. 1 illustrates a block diagram of a vehicle driving mode detection system.

FIG. 1 illustrates a block diagram of vehicle driving mode detection system 100. Driving mode detection system 100 may comprise an on-board device 120 installed in vehicle 190, which may include one or more occupants, e.g., a driver or an operator, one or more passengers, or any combination thereof.

Vehicle 190 as shown in FIG. 1 is an automobile. However, vehicle 190 may take any number of forms, including, as examples, a bus, truck, van, mini-van, sports utility vehicle (SUV), helicopter, airplane, construction vehicle, boat, trailer, all-terrain vehicle (ATV), motorcycle, moped, tractor, hybrid vehicle, electric vehicle, ambulance, marine vessel, boat, submarine, or other vehicles.

On-board device 120 may include sensor interface 152 that may interface with one or more external sensors in vehicle 190 to detect a driving mode of the vehicle. Alternatively, sensor interface 152 may interface with a sensor unit internal to on-board device 120 to detect the driving mode of vehicle 190. Sensor unit 152 may include, for example, pressure sensors, gyroscopes, temperature sensors, voltage and current monitors, magnetic sensors, microelectromechanical sensors, mechatronic sensors, position sensors, and compass sensors. Via sensor unit/sensor interface 152, on-board device 120 may collect various operating parameters and establish a database. The database may be stored as local database 144 in memory 123 or may be uploaded over communication network 192 as remote database 194.

Database 194 may be operated or maintained by the owner of vehicle 190. Alternatively, database 194 may be operated or maintained by a third-party that may grant access to database 194 to commercial or private operators and owners of vehicles. Database 194 may be distributed, such as in a cloud of distributed, networked computer servers.

On-board device 120 may also include locator interface 154. Locator interface 154 may be a GPS receiver that is able to receive transmissions from GPS satellites providing the vehicle with a means to determine its location on the earth. The GPS coordinates may be used together with a map software to provide vehicle 190 and its occupants with an indication of where vehicle 190 is located along a roadway, waterway, or anywhere on a map provided by the map software. Locator interface 154 may receive GPS transmissions from satellite 165.

On-board device 120 may communicate with any number of communication networks, including communication network 192, which may take any number of forms such as a cellular network, a satellite network, or a wireless Local Area Network (LAN) connected to an internet or private network. The on-board device 120 may communicate according to any number of communication protocols, standards, networks, or topologies. As examples, the on-board device 120 may communicate across cellular networks or standards (e.g., 2G, 3G, 4G, Universal Mobile Telecommunications System (UMTS), GSM® Association, Long Term Evolution (LTE)™, or more), WiMAX, Bluetooth, WiFi (including 802.11 a/b/g/n/ac or others), WiGig, Global Positioning System (GPS) networks, and others available at the time of the filing of this application or that may be developed in the future. The on-board device 120 may include processing circuitry, data ports, transmitters, receivers, transceivers, or any combination thereof to communicate across any of the above-listed protocols, standards, networks, or topologies.

On-board device 120 may be configured according to any number of user requirements with respect to communication capabilities, data transfer configurations, data collection configurations, and other configurations. The on-board device 120 may also collect any vehicle data, such as performance statistics, route information, position data, traffic data, and others. In an example embodiment, on-board device 120 may include telemetry functionality to collect and/or send vehicle data. These telemetry functions may include measurements and/or records of speed, direction, acceleration, pitch, yawl, and roll of the vehicle 190, and measurements and/or records of rate of change for speed, direction, acceleration, pitch, yawl, and roll of vehicle 190. The telemetry functions may also include measurements and/or records of operations of brake pedal, revolutions per minute (rpm) of an engine, a wheel; difference of the rpm between wheels of the automobile; amount of gearbox shift and torque; working condition of the gearbox and/or a transmission; and gas level of the vehicle 190. One example of on-board device 120 is the Openmatics© on-board unit provided by ZF Friedrichshafen AG.

The telemetry functionality may be performed or managed by processor 122. Processor 122 may be configured to operate a set of instructions stored in local memory 123. For example, memory 123 may store a set of instructions to direct processor 122 to perform acts of detecting an abnormal driving mode/behavior of the vehicle, and processor 122 may be configured to execute these instructions.

Memory 123 may be of any form available at the time of the filing of this application or that may be developed in the future. For example, memory 123 may be of transitory memory or non-transitory memory, such as hard disk, solid disk, CD ROM, or other types of memory available.

Further, on-board device 120 may include or may execute a variety of operating systems 141, including a personal computer operating system, such as a Windows, iOS or Linux, or a mobile operating system, such as iOS, Android, or Windows Mobile, or the like. On-board device 120 may include or may execute a variety of possible applications 142, such as a browser 145 and/or data processing software 143.

Alternatively, the on-board device 120 may be a specially programmed desktop computer or portable device capable of achieve the above functionality. The portable device may be of any form available at the time of the application, such as a cellular telephone or a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

On-board device 120 may also include communication ports 156 and user interface 160.

All of the above mentioned components may be located in a same box or housing of on-board device 120 or may be installed in the vehicle 190 so that signals and/or data that the on-board device 120 receives may be transmitted among these components. On-board device 120 may communicate with and transmit processed data to an information center 196 remote from the vehicle 190.

Alternatively, the above mentioned components of on-board device 120, such as communication ports 156, processor 122, database 144, memory 123, sensor unit/sensor interface 152, locator interface 154, and user interface 160, may be discretely distributed in various locations inside or on the vehicle, or in information center 196 remote from vehicle 190. These components may communicate with each other via wired and/or wireless communications.

For example, processor 122 and sensor unit/sensor interface 152 may be assembled in a same box or on a same circuit board of the on-board device 120, and mounted on vehicle 190, so that signals/data measured by the sensor unit/sensor interface 152 may be transmitted and processed locally. The processed data may be sent to information center 196, such as a server in a police station or a server of a research center that monitors driving behaviors of vehicle 190, via a communication network.

Alternatively, sensor unit/sensor interface 152 of vehicle driving mode detection system 100 may be mounted on vehicle 190 and processor 122 may be located in information center 196. Accordingly, signals/data measured by sensor unit/sensor interface 152 may be sent to processor 122 via a communication network and be processed remotely in information center 196.

Figure 2:
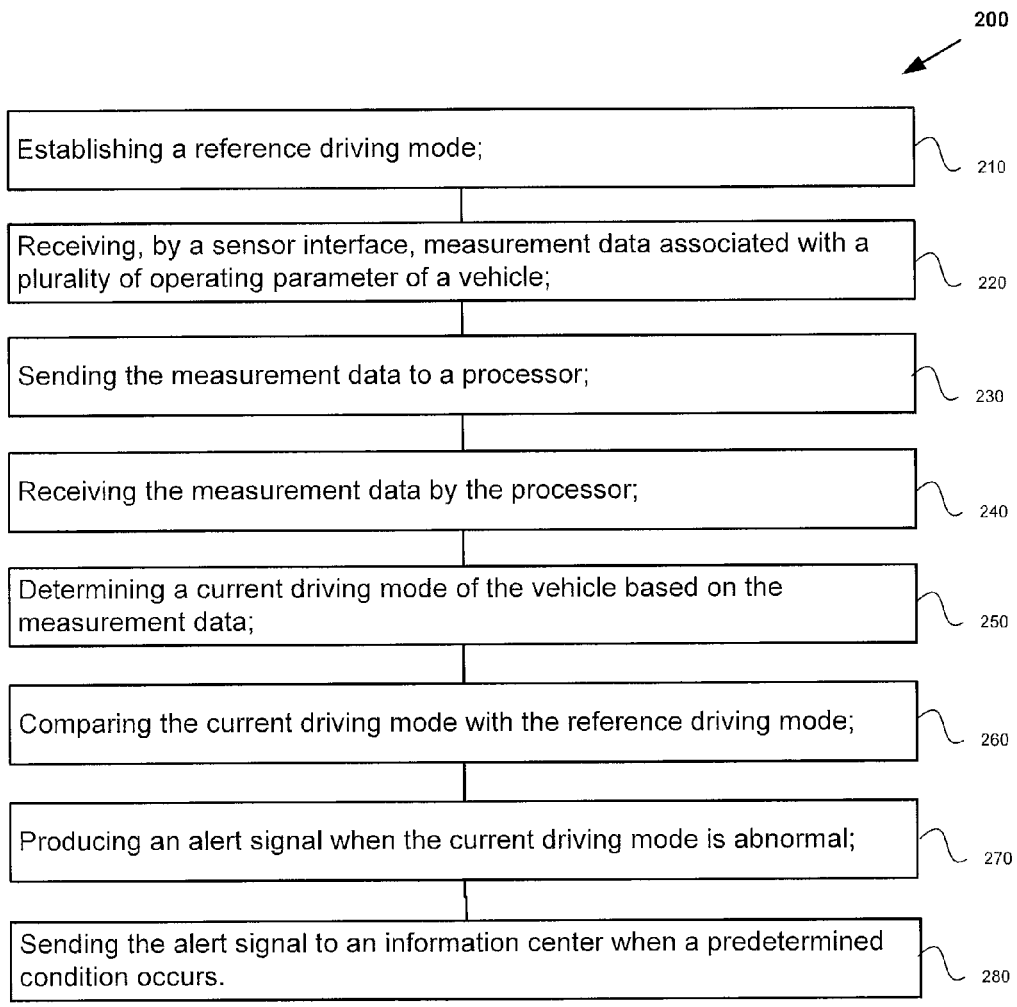
FIG. 2 is a flow diagram illustrating a set of instructions for vehicle driving mode detection.

FIG. 2 is a flow diagram illustrating a set of instructions for detecting abnormal driving mode of a vehicle. These instructions may be saved in a memory of a vehicle driving mode detection system and may be executed by a processor or other components of the vehicle driving mode detection system. The flow diagram may also illustrate a method of detecting abnormal driving mode of a vehicle. In this example, the flow diagram is applied to vehicle driving mode detection system 100 as shown in FIG. 1. However, the set of instructions illustrated in the flow diagram in FIG. 2 and the method reflected therein may be adopted to any vehicle driving mode detection system.

Under instruction 210, vehicle driving mode detection system 100 may first establish a database reflecting a reference and/or normal driving mode of vehicle 190. As vehicle 190 travels along a route, on-board device 120 may record measurement data for various operating parameters of vehicle 190. Processor 122 may execute instruction 210 to receive measurement data via sensor unit/sensor interface 152 and/or data from external sensors through sensor interface 152. On-board device 120 may also receive measurement data from remote sensors via communication ports 156 and/or communication network 192.

The various operating parameters of vehicle 190 may include, for example, speed, velocity, direction of travel, acceleration, throttle position, brake pedal position, temperature of components in the vehicle, ambient temperature, pressure and/or levels of vehicle fluids (both liquids and gases), vehicle weight, occupancy, measurements of the vehicle's electrical system, fuel efficiency, exhaust measurements, noise measurements, wind speed, revolutions per minute (rpm) of the engine and wheels of the vehicle; difference of the rpm between the wheels of the vehicle; amount of gearbox shift and torque; working condition of the gearbox and/or transmission of the vehicle. These operating parameters listed are merely exemplary.

On-board device 120 may also track the location of vehicle 190 while measuring the various operating parameters of vehicle 190. For example, on-board device 120 may track the location of vehicle 190 using GPS from satellite 165. GPS signals may be received via locator interface 154. At specified intervals, the on-board device 120 may record GPS coordinates of the vehicle 190.

On-board device 120 may store the measurement data of the operating parameters of vehicle 190 to database 144 of memory 123 in a predetermined format. Alternatively, on-board device 120 may upload the measurement data of the operating parameters to database 194 over communication network 192.

The predetermined format may store measurement data of an operating parameter independently. For example, the following parameters may be stored in database 144 or database 194 without reference to each other: brake operation data, transmission operation data, speed data, and location data.

Alternatively, the predetermined format may associate measurement data of one operating parameter with another operating parameter. For example, the predetermined format may associate speed, brake operation, and transmission operation data with a specific location at which the data was measured. On-board device 120 may create a log of locations and corresponding measurements as the vehicle travels along a route. This log may be stored in database 144 or database 194.

On-board device 120 may record the measurement data for each trip of vehicle 190, analyze the driving behavior of the operator of vehicle 190 via the measurement data, and determine a normal driving mode of vehicle 190 as a reference driving mode.

The reference driving mode may be based on the measurement data of a single operating parameter or may be based on an analysis of a plurality of operating parameters. For example, processor 122 may analyze the brake pedal operation of the operator and determine specific habits of the operator when he/she presses the brake pedal of vehicle 190. For example, the analysis may reveal that when stopping at a traffic light, the operator may habitually release the brake pedal slightly to reduce the jolting motion occurring as the brakes bring vehicle 190 to a stop. Similarly, processor 122 may also analyze the acceleration habit of the operator when driving vehicle 190. For example, the analysis may reveal that the operator habitually accelerates vehicle 190 from 0 mph (mile/miles per hour) to 30 mph, remains at 30 mph for approximately 5 seconds, and then accelerates vehicle 190 to 50 mph. This analysis may account for location. For example, the operator may display the pattern of acceleration described above each time he/she leaves a particular location, such as his/her place of employment. Alternatively, processor 122 may analyze the driving behavior of the operator based on a comprehensive analysis of the braking and acceleration habits of the operator. A comprehensive analysis may also be associated with other parameters such as vehicle location.

The reference driving mode may reflect general driving behaviors, patterns, and characteristics, such as general braking or acceleration habits of a particular operator that may or may not be associated with specific locations. The reference driving mode may also reflect driving behaviors patterns, and characteristics specifically associated with a particular section of road, such as the braking or acceleration action at a specific intersection.

Over time, database 144 and/or 194 that corresponds to the operator's driving behavior may be established and processor 122 may detect abnormal driving modes of vehicle 190 based on database 144 and/or 194, as shown in the following instructions.

Per instruction 220, sensor unit/sensor interface 152 may receive current measurement data of vehicle operating parameters when vehicle 190 is traveling along a route.

Per instruction 230, sensor unit/sensor interface 152 may transmit the current measurement data to processor 122. The data transmission may be local, for example, in an implementation where processor 122 and sensor unit/sensor interface 152 are located in the same housing or enclosure as on-board device 120. When processor 122 is located in a remote location from sensor unit/sensor interface 152, such as information center 196, sensor unit/sensor interface 152 may send the current measurement data to processor 122 through communication network 192. The data transmission may be transmitted at predetermined intervals, or the data transmitted in real-time on demand.

Upon receipt of the current measurement data, processor 122 may execute instruction 250 to analyze the current measurement data and determine a current driving mode of vehicle 190 based on the current measurement data. The current driving mode may be determined by analyzing the current measurement data of an individual vehicle operating parameter, such as brake operation of vehicle 190. The current driving mode may also be determined by comprehensively analyzing the current measurement data of several operating parameters.

Processor 122 may execute instruction 260 to compare the current driving mode with the reference driving mode. For example, if the vehicle is traveling along a route, on-board device 120 may receive the measurement data from sensor unit/sensor interface 152 at a predetermined interval, such as every 0.1 second. The measurement data may include, but is not limited to, velocity, brake pedal operation, acceleration operation, throttle operation, and transmission operation, and the corresponding location of vehicle 190. Processor 122 may analyze these measurement data and determine a current driving mode of vehicle 190. If vehicle 190 is traveling along a route that it previously traveled, on-board device 120 may retrieve the saved reference mode of the operator that corresponds to the specific location on the route. If the route has not been previously traveled by vehicle 190, processor 122 may retrieve the saved reference mode corresponding to general driving behavior of the operator.

If the current driving mode is not substantially deferent from the reference driving mode, processor 122 may conclude that vehicle 190 is traveling normally and safely. The current measurement data and driving mode may be stored to update in databases 144, 194.

However, if the current driving mode deviates or is different from the reference driving mode, processor 122 may determine that the vehicle 190 is traveling abnormally. The determination may be based on a predetermined threshold. The threshold may be set high enough to reject false positive detections of abnormal travel. For example, if velocity for the current driving mode deviates only 5% from velocity in the reference driving mode, then abnormal travel may not be detected. Upon detection of abnormal travel, processor 122 may execute instruction 270 and produce an alert signal.

Various driving behavior may trigger a determination of abnormal driving mode. In situations where the current driving mode is compared with a reference driving mode reflecting general driving behaviors of the operator, a combination of the measurement data, such as hitting the brake pedal more than twice as hard as normal, followed by a 100% throttle acceleration towards a forward and left direction, and followed by acceleration towards forward and right direction, may collectively indicate an aggressive and dangerous passing maneuver. If in a short period of time vehicle 190 experiences several such aggressive maneuvers, processor 122 may determine that vehicle 190 may be stolen and may be driven by an escaping criminal, or that the vehicle operator is engaged in reckless driving. Processor 122 may automatically send an alert signal to the authorities, vehicle owner, or other third party. Other measurement data that may be used in triggering a determination of abnormal driving mode may be, but not limited to, kick-down switch operation (i.e., downshifting to a lower gear for higher engine RPMs and acceleration), measurements of vehicle body impact, velocity, temperature of components in the vehicle, ambient temperature, pressure and/or levels of vehicle fluids (both liquids and gases), vehicle weight, occupancy, measurements of the vehicle's electrical system, fuel efficiency, exhaust measurements, noise measurements, of vehicle 190, or any combination thereof.

Figure 3:
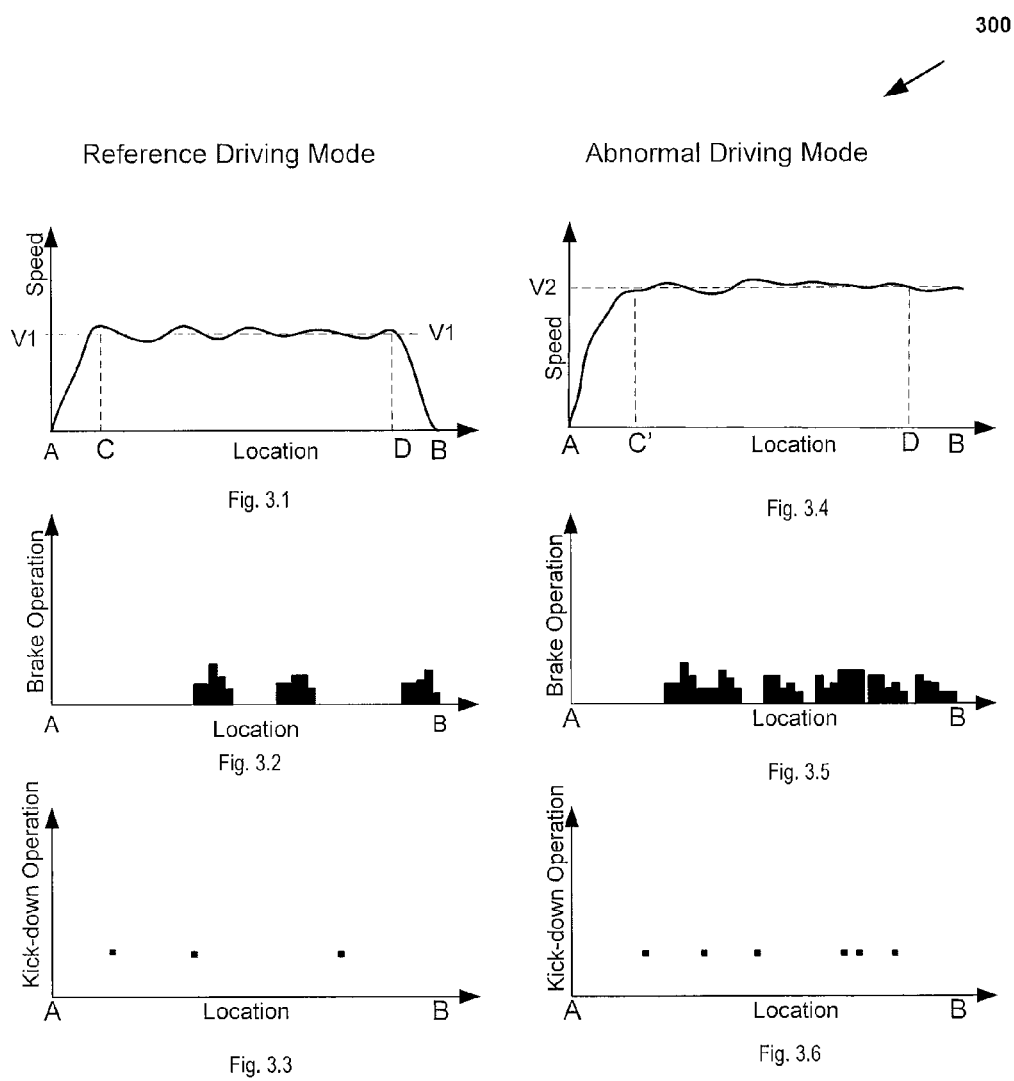
FIGS. 3.1-3.6 illustrate an comparison between an abnormal driving mode and a reference driving mode when a vehicle drives between two locations along a route, according to an example embodiment of the present application.

In situations where the current driving mode is compared with a reference driving mode reflecting driving behaviors associated with a specific route, processor 122 may further take into account overall driving behavior of the operator over a section of the route. FIGS. 3.1-3.6 illustrate an comparison between an abnormal driving mode and a reference driving mode when a vehicle drives between two locations A and B along a route, according to an example embodiment of the present application. FIGS. 3.1-3.3 illustrate an exemplary reference driving mode. FIGS. 3.4-3.6 illustrate an exemplary abnormal driving mode.

As shown in FIG. 3.1, vehicle 190 may gently accelerate from location A. At round location C, vehicle 190 reaches speed V1 and keeps travelling around speed V1. At around location D, vehicle 190 may gently decelerate until it stops at location B. During the travel between locations A and B, the operator may brake vehicle 190 three times, as shown in FIG. 3.2. Each brake operation may have a brake pattern matches general braking characteristics of the operator. Vehicle 190 may also experience three kick-down operation due to swift accelerations, as shown in FIG. 3.3. Because of specific road condition, these brake operations and kick-down operations may generally occur at particular locations between locations A and B.

An abnormal driving mode may differ from the reference driving mode in several aspects associated with the specific route between locations A and B. For example, as shown in FIG. 3.4, if vehicle 190 is kidnapped, an escaping kidnapper may accelerate vehicle 190 more aggressively between locations A and C' and may roughly remain in a speed V2 higher than the speed V1 during the travel between locations A and B. Vehicle 190 may not decelerate at location D and may keep driving through location B. Further, as shown in FIGS. 3.5-3.6, processor 122 may determine that vehicle 190 may experience substantially more brake operations and kick-down operations during the travel. These operations may occur at locations different from the reference driving mode shown in FIGS. 3.2-3.3. Patterns of the brake operations also may not match the general characteristics of the operator under the reference mode.

Comparing the accelerations, speed, brake operations, kick-down operations and their corresponding locations of occurrence comprehensively, processor 122 may determine that the operator may drive abnormally. Thus processor 122 may produce an alert signal accordingly.

The alert signal may be sent to the operator in various forms. It may be an obvious signal, such as flashing red light or yellow light in the user interface on the front panel of vehicle 190 or a beep sound from a speaker of vehicle 190 or a combination of the two. It may also be a subtle signal not intended to notify persons other than the vehicle operator or owner. For example, if a person steals a vehicle with the owner inside with the intent to kidnap the owner, a subtle alert signal, such as activating the low fuel indicator, may go unnoticed to the kidnapper, but may signal to the owner that an alert has been signaled. These forms of alert signals may occur in standard form or may be customized by the owner or operator of the vehicle driving mode detection system 100.

Vehicle driving mode detection system 100 may request that the operator respond to the alert signal with a predetermined action within a predetermined period of time to determine that the current abnormal driving mode is accidental or should be ignored. Failure to respond timely using the correct response method may be deemed an acknowledgement that the abnormal driving mode is not accidental. This may lead to a determination that the operator and the passenger in vehicle 190 is in danger and need immediate assistance or rescue. Alternatively, vehicle driving mode detection system 100 may request the operator to respond to the alert signal with a predetermined action within a predetermined period of time in order to determine that the abnormal driving mode is not accidental, and the operator and passenger are in danger and need immediate assistance or rescue. Failure to timely respond may be deemed an acknowledgement that the abnormal driving mode is accidental. This case, no further assistance is needed for the operator and passengers in vehicle 190.

The predetermined action may be an obvious action, such as pressing a button on the user interface 160 for five seconds within fifteen seconds of the alert signal. The predetermined action may be subtle, such as slightly pressing the brake pedal or acceleration pedal three times, or maneuvering the vehicle in an "S" pattern within fifteen seconds of the alert signal. Subtle action may be advantageous in the event that vehicle 190 is stolen and operator kidnapped. The operator may respond to the alert signal without causing notice of the kidnapper.

The predetermined action may be system defined, or may be defined by the operator or owner of vehicle driving mode detection system 100. Driving mode detection system 100 may record and recall the characteristics of the predetermined action conducted by the operator, so that the same predetermined action conducted by another person other than the operator may be distinguished and not accepted.

If processor 122 determines that the abnormal driving mode of vehicle 190 is not accidental, processor 122 may send the alert signal of the abnormal driving mode to the information center, such as a police station. For example, if the abnormal driving mode indicates that the vehicle is stolen, processor 122 may send a subtle alert signal to the vehicle requesting the operator to slightly press the brake pedal three times within fifteen seconds to confirm that the operator and the passengers therein are in fact not in danger. The criminal may not have knowledge of this setting and may ignore the subtle alert signal or may fail to respond to the alert signal by pressing the brake pedal. Or, if the criminal responds to the alert signal by pressing the brake pedal three times, processor 122 may recognize that the response does not match the characteristics of the operator, and thus does not accept the response. Processor 122 may determine that vehicle 190 is stolen and may send an alert signal indicative of stolen vehicle or kidnapped persons to a police station nearby according to the location of the vehicle 190 as determined by GPS.

Alternatively or additionally, processor 122 may send an alert signal directly to the information center without requesting a response from the operator, when the current driving mode is substantially similar to a predefined reference mode. For example, the predefined reference mode may reflect an emergency or critical situation, such as an automobile accident involving vehicle 190. These situations may justify an immediate rescue without requiring confirmation from the operator. This may advantageously permit the operator to focus on defending or helping himself/herself. For example, processor 122 may send an alert signal directly to a police station nearby if it determines that vehicle 190 had experienced a severe impact and the subsequent velocity of the vehicle 190 is either substantially lower or substantially higher and towards a different direction, which is indicative of a severe car accident. Further, the predefined reference mode may reflect other emergency situations such as a stolen vehicle or high speed chase. Processor 122 may send an alert signal on this basis to the local authorities.

As described above, systems for vehicle driving mode detection and methods of conducting the same have been described in the present application. According to example embodiments, the system may determine a current driving mode of a vehicle based on measurement data of various operating parameters of the vehicle. When the driving mode is abnormal but the vehicle is not in an emergency, the system may request confirmation from the operator of the vehicle that the vehicle is traveling safely, or the system may report the abnormal driving mode to an information center. When the vehicle is involved in an emergency situation, the system may proceed to report to the information center, such as a nearest police station, for immediate rescue without requesting confirmation from the operator.

While various embodiments of the invention have been described, it will be apparent to those of ordinary skill in the art that many more embodiments and implementations are possible within the scope of the invention. It is intended that the foregoing detailed description be regarded as illustrative rather than limiting, and that it be understood that it is the following claims, including all equivalents, that are intended to define the spirit and scope of this invention.

The invention claimed is:

1. A vehicle driving mode detection system, comprising:
   a sensor interface configured to:
     receive measurement data associated with a plurality of operating parameters of a vehicle;
     send the measurement data to a processor; and
   the processor configured to execute a set of instructions stored in a computer-readable storage medium to:
     receive the measurement data from the sensor interface;
     determine a driving mode of the vehicle based on the measurement data;
     compare the driving mode of the vehicle with a reference driving mode of the vehicle;
     produce an alert signal when the driving mode is substantially different from the reference driving mode; and
     send the alert signal to an information center remote to the sensor interface when a predetermined condition occurs,
   wherein the predetermined condition occurs when the processor receives a first predetermined response to the alert signal from the vehicle in a first predetermined period of time.

2. The vehicle driving mode detection system according to claim 1, wherein the predetermined condition occurs when the processor does not receive a second predetermined response to the alert signal from the vehicle in a second predetermined period of time.

3. The vehicle driving mode detection system according to claim 1, wherein the predetermined response is at least one of:
   a button of the vehicle being pressed in a predetermined manner;
   a brake pedal of the vehicle being pressed in a predetermined manner;
   an accelerator pedal of the vehicle being pressed in a predetermined manner; and
   the vehicle being maneuvered in a predetermined manner.

4. The vehicle driving mode detection system according to claim 1, wherein the reference mode is a first reference mode and the alert signal is a first alert signal, and wherein the processor is further configured to send a second alert signal to the information center when the driving mode is substantially similar to a second reference mode.

5. The vehicle driving mode detection system according to claim 1, wherein the sensor interface and processor are installed in the vehicle, and
   wherein the processor is further configured to send the alert signal to the information center wirelessly.

6. The vehicle driving mode detection system according to claim 1, wherein the sensor interface is installed in the vehicle and the processor is installed in the information center; and
   wherein the processor is further configured to receive the measurement data via wireless communications with the sensor interface.

7. The vehicle driving mode detection system according to claim 1, wherein the plurality of operating parameters reflects at least one of
   brake use of the vehicle;
   revolutions per minute (rpm) of an engine of the vehicle;
   rpm of a wheel of the vehicle;
   a difference between rpm of the engine and the wheel of the vehicle;
   a difference between rpm of wheels of the vehicle;
   an acceleration of the vehicle;
   an amount of gearbox shift and torque of the vehicle;
   a working condition of the gearbox of the vehicle;
   a working condition of the transmission of the vehicle; and
   a gas level of the vehicle.

8. A computer-implemented method of vehicle driving mode detection, the method comprising:
   receiving, by a computer from a sensor, measurement data associated with a plurality of operating parameters of a vehicle;
   determining, by the computer, a driving mode of the vehicle based on the measurement data;
   producing, by the computer, an alert signal when the driving mode deviates from a reference driving mode by a predetermined threshold; and
   sending, by the computer, the alert signal to an information center remote to the sensor when a predetermined condition occurs,
   wherein the predetermined condition occurs when the computer does not receive a first predetermined response to the alert signal from the vehicle in a first predetermined period of time.

9. The computer-implemented method according to claim 8, wherein the predetermined condition occurs when the computer receives a second predetermined response to the alert signal from the vehicle in a second predetermined period of time.

10. The computer-implemented method according to claim 9, wherein the predetermined response is at least one of:
   a button of the vehicle being pressed in a predetermined manner;

a brake pedal of the vehicle being pressed in a predetermined manner;

an accelerator pedal of the vehicle being pressed in a predetermined manner; and the vehicle being maneuvered in a predetermined manner.

11. The computer-implemented method according to claim 8, wherein the reference driving mode is a first reference driving mode and the alert signal is a first alert signal, the method further comprising sending, by the computer, a second alert signal to the information center when the driving mode is substantially similar to a second reference mode.

12. The computer-implemented method according to claim 8, further comprising sending the alert signal to the information center via wireless communications with the information center.

13. A non-transitory computer-readable storage medium comprising a set of instructions for detecting driving mode of a vehicle, the set of instructions to direct a processor to perform acts of:

receiving, from a sensor interface, measurement data associated with a plurality of operating parameters of a vehicle;

determining a driving mode of the vehicle based on the measurement data;

producing an alert signal when the driving mode deviates from a reference driving mode by a predetermined threshold; and sending the alert signal to an information center remote to the sensor interface when a predetermined condition occurs, wherein the predetermined condition occurs when the processor does not receive a first predetermined response to the alert signal from the vehicle in a first predetermined period of time, or when the processor receives a second predetermined response to the alert signal from the vehicle in a second predetermined period of time.

14. The non-transitory computer-readable storage medium according to claim 13, wherein the predetermined response is at least one of:

a button of the vehicle being pressed in a predetermined manner;

a brake pedal of the vehicle being pressed in a predetermined manner;

an accelerator pedal of the vehicle being pressed in a predetermined manner; and the vehicle being maneuvered in a predetermined manner.

15. The non-transitory computer-readable storage medium according to claim 13, wherein the reference driving mode is a first reference driving mode and the alert signal is a first alert signal, and wherein the instructions further direct the processor to send a second alert signal to the information center when the driving mode is substantially similar to a second reference mode.

16. The non-transitory computer-readable storage medium according to claim 15, wherein the instructions further direct the processor to send the alert signal to the information center wirelessly.

* * * * *